March 9, 1937.  J. C. HOBBS  2,073,404
MOTOR AND DRIVEN ELEMENT ASSEMBLY
Original Filed Jan. 6, 1932

Witness
Chas. T. Olson

Inventor
James C. Hobbs
by his Attorneys
Van Evera Fish Aldaly Perry

Patented Mar. 9, 1937

2,073,404

UNITED STATES PATENT OFFICE 2,073,404

MOTOR AND DRIVEN ELEMENT ASSEMBLY

James C. Hobbs, Painesville, Ohio, assignor to B. F. Sturtevant Company, Boston, Mass., a corporation of Massachusetts Application January 6, 1932, Serial No. 585,147
Renewed July 15, 1936

2 Claims. (Cl. 230—117)

The present invention relates to motor and driven element assemblies.

The conventional connection between a motor and its driven element requires the use of two shafts separately mounted in two pairs of bearings, together with a coupling between the shafts. This construction presents difficulties, particularly in large machines, in establishing and maintaining alignment. Any changes of alignment, due to imperfect coupling or expansions and contractions of the different parts, result in excessive wear on the bearings and troublesome vibration. Moreover, parts are often inaccessible and even a minor replacement or repair frequently necessitates dismantling of the equipment with consequent further difficulties in re-establishing proper alignment. These disadvantages are further increased when the driven element is selectively operated by either of two motors arranged on opposite sides thereof, in which case, alignment must be established between three shafts and six bearings.

The principal object of the present invention is to provide a motor and driven element assembly employing one or more driving motors in which perfect alignment is insured, both initially and in continued use, and the parts are readily accessible for repair or replacement.

With this and other objects in view, as will hereinafter appear, the principal feature of the present invention comprises a single shaft to which both the driven element and the rotor are secured, together with a single pair of bearings for the shaft and supports for the bearing and the motor stator. In the preferred construction, the rotor overhangs the bearing, thus rendering the motor easily accessible for repair without dismantling of the driven element. Furthermore, the overhanging weight of the rotor produces a more favorable loading of the shaft, with consequent diminished wear on the bearings. The invention is equally applicable to the use of two overhanging rotors at opposite ends of the shaft for selective operation of the driven element.

Other features of the invention consist in certain novel features of construction, combinations and arrangement of parts hereinafter described and particularly defined in the claims.

Figure 1:
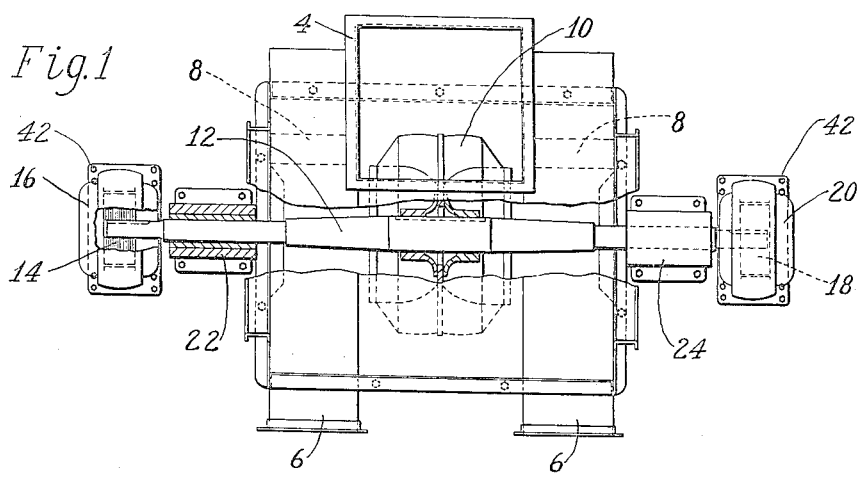
Figure 2:
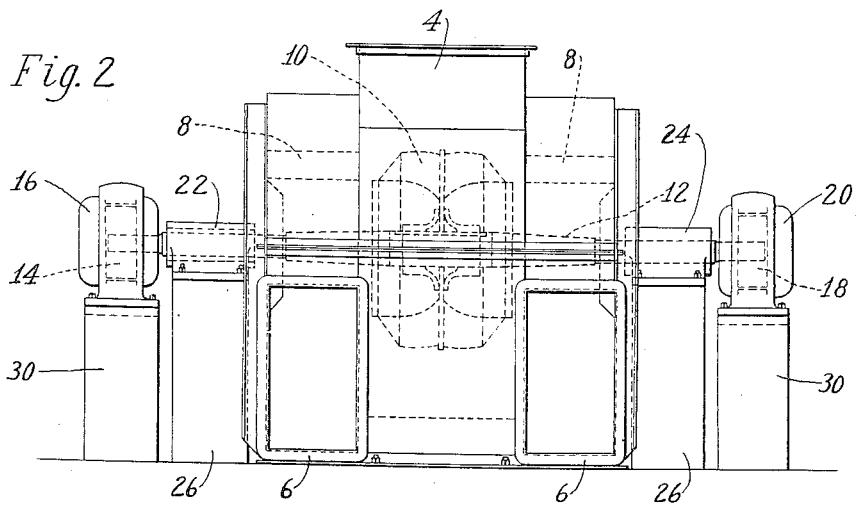
Figure 3:
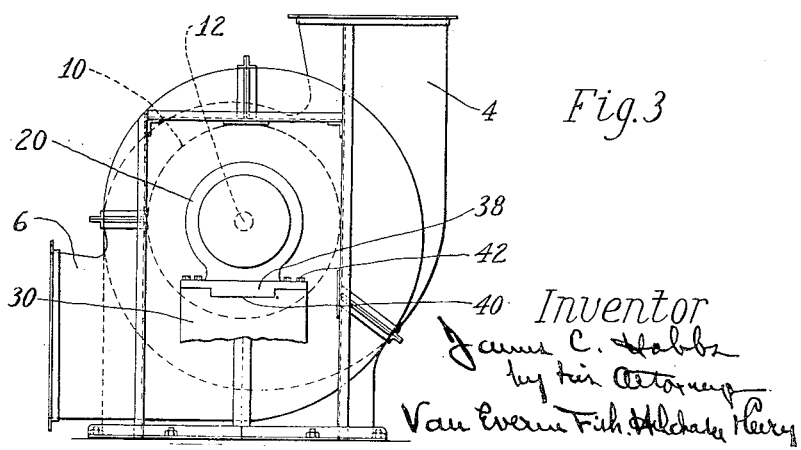

In the accompanying drawing, Fig. 1 is a plan view, partly in section, of what is now considered the preferred form of the invention; Fig. 2 is a front elevation; and Fig. 3 is an end elevation.

The invention is herein illustrated and described as embodied in a two motor drive for an induced draft fan. The fan, as indicated in Fig. 1, has the usual spiral outlet casing 4 and spiral inlet casings 6 on opposite sides thereof. The output of the fan is preferably controlled by vanes 8 arranged in the inlet casing adjacent to the eye of the fan for imparting a controllable spin velocity to the entering fluid. The fan wheel 10 within the casing is mounted on a shaft 12 which has mounted at one end a rotor 14 for a high speed motor 16 and at the other end a rotor 18 for a low speed motor 20. The wheel 10 and both rotors are keyed or otherwise secured to the shaft in any suitable manner.

Between each motor and the fan, the shaft is journaled in a bearing, the two bearings being illustrated at 22 and 24. The bearings are independently mounted on bearing pedestals 26.

The stator of each motor is mounted independently of its rotor on supports 30. The motor stators are entirely independent of their rotors and are so mounted that proper clearance is maintained. The motor frames may be bolted directly to the supports 30, but the support shown in Fig. 3 is preferable, in case it is desired to remove one of the stators while the fan is being driven by the other motor. In this construction, the motor support is formed with a longitudinal groove 40 cooperating with a similarly formed base 38 of the motor frame. The motor is secured in place by bolts 42. This arrangement forms ways or guides to permit sliding of the motor frame off the support without danger of damage to the parts and with assurance of proper alignment and clearance on reassembly.

If desired, the motor support and bearing pedestal may be combined as a single unit secured to the foundation.

In the construction shown, the motors are of the constant speed type, the left-hand motor 16 serving to operate the fan at high speed and the right-hand motor 20 serving to operate the fan at lower speed, finer graduations of the fan output being obtained by adjustment of the air inlet vanes 8 for either speed. Only one of the motors is energized at a time, the other merely rotating idly. The invention, however, is not limited to the particular type of motors and driven element employed and is equally adapted for use with variable speed motors and with other types of driven elements. When selective operation with two motors is not necessary, one of the motors may be omitted.

Inasmuch as the entire rotative assembly is supported on a single shaft journaled in a single pair of bearings, there is no possibility of misalignment, with consequent vibration and destruction of the bearings. In setting up the apparatus, it is only necessary to adjust the stator supports for proper clearance between the stators and rotors—an operation that can be conveniently carried out by the use of suitable shims.

The cost of the assembly is greatly reduced with respect to that of the conventional system of mounting because in the construction shown, four bearings, two shafts, and two couplings are eliminated. Moreover, there is no necessity for accurate assembly of separate motor bearings with respect to each rotor and its stator.

The stator of either motor is easily removable and with care may actually be removed while the machine is running. Repair or replacement of the motor parts is conveniently accomplished without dismantling the fan. Even when major alterations with complete dismantling of the equipment are necessary, the parts may be readily restored to their proper positions with assurance of re-establishment of correct alignment.

It will be noted that with a single thrust bearing 24, the shaft readily accommodates itself to expansions upon changes of temperature. These expansions, which must be taken care of in an induced draft fan, are evidenced by a slight longitudinal shifting of the rotor 14 with respect to its stator, in no way affecting the operation of the apparatus.

It will be noted further that the loading of the shaft at its ends by the rotors introduces bending moments to compensate for the bending moment due to the loading of the shaft by the fan wheel, thereby centering the axis of the shaft with respect to the bearing and diminishing any tendency toward whipping of the shaft which, in the conventional assembly, may cause undue wear on the shaft and bearings.

Having thus described the invention, what is claimed is:

1. The combination with an induced draft fan having a rotating fan wheel and a casing which is subjected to temperature variations and which encloses the fan wheel, of a single shaft to which the fan wheel is centrally secured, a high speed motor and a low speed motor each having a stator and a rotor, the two rotors being secured at opposite ends of the shaft, a single pair of bearings in which said shaft is journaled and disposed respectively between the casing and the motor stators so that the rotors overhang the bearings, bearing pedestals independent of said casing and forming the sole supports for said bearings, and supports for the motor stators independent of the bearing pedestals and having guides to provide for adjustment and removal of each stator longitudinally of the shaft.

2. The combination with a fan having a rotating fan wheel and a casing which encloses the fan wheel, of a single shaft to which the fan wheel is centrally secured, a high speed motor and a low speed motor each having a stator and a rotor, the two rotors being secured at opposite ends of the shaft, a single pair of bearings in which said shaft is journaled and disposed respectively between the casing and the motor stators so that the rotors overhang the bearings, bearing pedestals independent of said casing and forming the sole supports for said bearings, and supports for the motor stators independent of the bearing pedestals and having guides to provide for adjustment and removal of each stator longitudinally of the shaft.

JAMES C. HOBBS.